United States Patent
Lozano et al.

(10) Patent No.: US 12,483,963 B2
(45) Date of Patent: Nov. 25, 2025

(54) INTELLIGENT CLIENT STEERING IN MESH NETWORKS

(71) Applicant: NETGEAR, Inc., San Jose, CA (US)

(72) Inventors: Fernando Lozano, Woodside, CA (US); Yu Te Lin, Kaohsiung (TW); Deeksha Kamath, San Jose, CA (US); Chunyi Guo, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 439 days.

(21) Appl. No.: 18/146,936

(22) Filed: Dec. 27, 2022

(65) Prior Publication Data

US 2024/0214903 A1 Jun. 27, 2024

(51) Int. Cl.
*H04L 41/16* (2022.01)
*H04W 40/06* (2009.01)
*H04W 40/30* (2009.01)

(52) U.S. Cl.
CPC .......... *H04W 40/06* (2013.01); *H04L 41/16* (2013.01); *H04W 40/30* (2013.01)

(58) Field of Classification Search
CPC ........ H04L 41/16; H04W 40/06; H04W 40/30
See application file for complete search history.

(56) References Cited

U.S. PATENT DOCUMENTS

| | | | |
|---|---|---|---|
| 2007/0002813 A1* | 1/2007 | Tenny | H04W 64/00 370/338 |
| 2014/0204802 A1* | 7/2014 | Han | H04W 76/10 370/255 |
| 2017/0188271 A1* | 6/2017 | Van Oost | H04W 84/12 |
| 2018/0089566 A1* | 3/2018 | Li | G06N 3/08 |
| 2018/0213412 A1* | 7/2018 | Makati | H04W 16/26 |
| 2019/0172045 A1* | 6/2019 | Dunjic | G06Q 20/3224 |
| 2020/0154328 A1* | 5/2020 | Strater | H04L 43/028 |
| 2021/0211875 A1* | 7/2021 | D. R. | H04L 63/0838 |

* cited by examiner

*Primary Examiner* — James P Duffy
(74) *Attorney, Agent, or Firm* — PERKINS COIE LLP

(57) ABSTRACT

Apparatuses, methods, and systems for client steering in mesh networks are disclosed. A first access point (AP) of a network sends a quality of service (QoS) data packet to a client device. A received signal strength indication (RSSI) of the client device is captured using the QoS data packet. A distance between the AP and client device is determined using a Wi-Fi round trip time. A time and day of week is determined. Using machine learning, a second AP is identified for steering the client device to, based on the RSSI, the distance, and the time and day of week. A machine learning model is trained to steer each client device to a respective AP for increasing a throughput of the network based on features extracted from client behavior of the client devices. The second AP is connected to the client device.

19 Claims, 8 Drawing Sheets

INTELLIGENT CLIENT STEERING IN MESH NETWORKS

TECHNICAL FIELD

The present disclosure is generally related to deploying wireless connectivity.

BACKGROUND

Internet speeds and Wi-Fi have improved recently. Mesh Wi-Fi is a whole home Wi-Fi system built to reduce dead zones and to provide improved Wi-Fi throughput. However, wireless networks can slow down when client devices are too far from a router. The further a client device is from a router, the more unreliable the connection and its throughput. Moreover, a lack of bandwidth can affect wireless networks, for example, when multiple client devices are in use, the network is spread thin or the access speed slows down.

DETAILED DESCRIPTION

Figure 1:
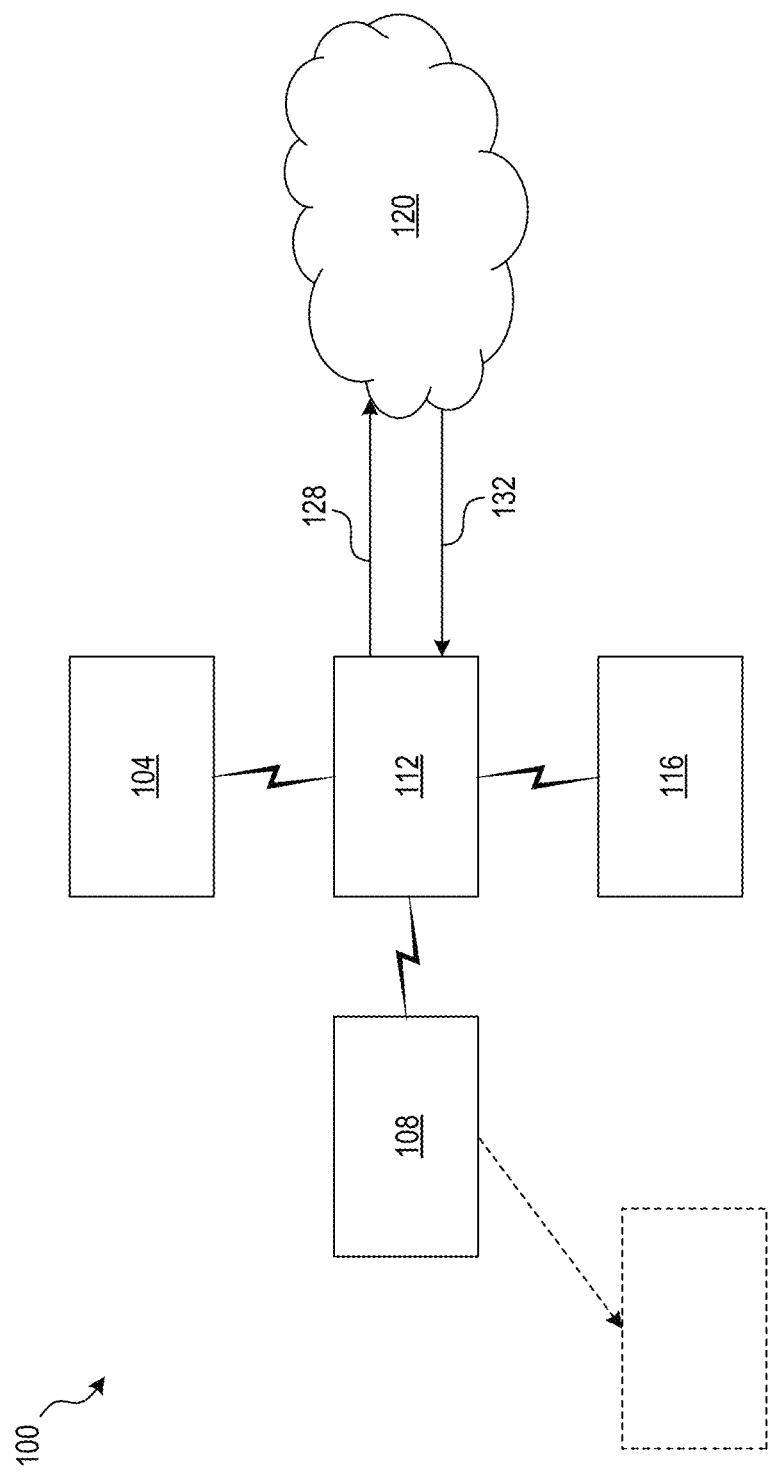
FIG. 1 is a block diagram illustrating an example wireless network, in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "1010") can implement components, operations, or structures (e.g., "1010*a*") described as a single instance. Further, plural instances (e.g., "1010") refer collectively to a set of components, operations, or structures (e.g., "1010*a*") described as a single instance. The description of a single component (e.g., "1010*a*") applies equally to a like-numbered component (e.g., "1010*b*") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

A wireless mesh network (WMN) is a communications network made up of radio nodes organized in a mesh topology. A WMN can be a form of wireless ad hoc network. A mesh refers to rich interconnection among devices or nodes. Wireless mesh networks often consist of mesh clients, mesh routers and gateways. Mobility of nodes is less frequent. In a wireless mesh network, topology tends to be more static, so that routes computation can converge and delivery of data to their destinations can occur. Hence, this is a low-mobility centralized form of wireless ad hoc network.

Mesh clients are often laptops, cell phones, and other wireless devices. Mesh routers forward traffic to and from the gateways, which may or may not be connected to the Internet. The coverage area of radio nodes working as a single network is sometimes called a mesh cloud. Access to this mesh cloud depends on the radio nodes working together to create a radio network. A mesh network is reliable and offers redundancy. When one node can no longer operate, the rest of the nodes can still communicate with each other, directly or through one or more intermediate nodes. Wireless mesh networks can self-form and self-heal. Wireless mesh networks work with different wireless technologies including 802.11, 802.15, 802.16, cellular technologies and need not be restricted to any one technology or protocol.

The embodiments disclosed herein describe methods, apparatuses, and systems for intelligent client steering in a mesh network. In embodiments, a first wireless access point (AP) of the mesh network transmits a quality of service (QoS) data packet to a client device of a plurality of client devices. The mesh network comprises a plurality of wireless APs comprising the first wireless AP. A received signal strength indication (RSSI) of the client device is captured using the QoS data packet. A distance between the wireless AP and the client device is determined using a Wi-Fi round trip time (Wi-Fi RTT). A time and day of week are determined.

A machine learning model indicates a second wireless AP of the plurality of wireless APs for steering the client device to, based on the RSSI, the distance, and the time and day of week. The machine learning model is trained to steer each client device of the plurality of client devices to a respective wireless AP of the plurality of wireless APs for increasing a throughput of the mesh network based on features extracted from client behavior of the plurality of client devices. The second wireless AP is connected to the client device.

In embodiments, the client device is a first client device. Training the machine learning model comprises determining that a second client device is a stationary client device. The machine learning model is configured to avoid steering the second client device.

In embodiments, features are extracted from the client behavior of the plurality of client devices. The features include RSSI metrics and distance metrics associated with times and days of week. The machine learning model is trained, based on the features, to steer the each client device to the respective wireless AP for increasing the throughput.

In embodiments, the RSSI metrics and distance metrics associated with times and days of week are sent to a cloud server for extracting the features. Training the machine learning model is performed on the cloud server.

In embodiments, it is determined that a location of the client device matches an expected location based on the extracted features. The machine learning model is updated based on the location of the client device.

In embodiments, the QoS data packet is a first QoS data packet, the RSSI is a first RSSI, and the distance is a first distance. It is determined that a location of the client device mismatches an expected location based on the features. Responsive to determining that the location mismatches the expected location, a second QoS data packet is sent to the client device for capturing a second RSSI of the client device using the second QoS data packet. A second distance between the wireless AP and the client device is determined. The machine learning model is trained, based on the second RSSI and the second distance, to steer the client device for increasing the throughput.

In embodiments, connecting the second wireless AP to the client device avoids null spots within the mesh network.

In embodiments, transmitting the QoS data packet is performed responsive to booting of the wireless AP.

In embodiments, it is determined that the client device is connected to the wireless AP for a first time based on determining absence of an identifier of the client device in a list of client devices maintained by the mesh network.

In embodiments, the time and day of week is a first time and day of week. A first location of the client device is determined. It is determined, based on the machine learning model, that the client device will move to a second location at a second time and day of week.

In embodiments, it is determined that a client device is connected to a wireless AP for a first time. The mesh network comprises a plurality of wireless APs comprising the wireless AP. A QoS data packet is sent to the client device. An RSSI is captured using the QoS data packet. A distance between the wireless AP and the client device is determined. A time and day of week is determined. The RSSI, the distance, and the time and day of week are sent to a cloud server for training a machine learning model to steer the client device to a respective wireless AP of the plurality of wireless APs for increasing a throughput of the mesh network based on the RSSI, the distance, and the time and day of week.

In embodiments, determining that the client device is connected to the wireless AP Is performed responsive to booting of the wireless AP.

In embodiments, determining that the client device is connected to the wireless AP for the first time includes determining absence of an identifier of the client device in a list of client devices maintained by the mesh network.

In embodiments, the time and day of week is a first time and day of week. A first location of the client device is determined. The cloud server sends an indication that the client device will move to a second location at a second time and day of week based on the machine learning model.

In embodiments, the RSSI is a first RSSI. The QoS data packet is periodically sent to the client device. A second RSSI of the client device is captured using the periodically transmitted QoS data packet. A difference between the first RSSI and the second RSSI is determined. Responsive to the difference exceeding a threshold difference, the difference is sent to the cloud server for training the machine learning model.

In embodiments, the machine learning model is received from the cloud server. The machine learning model is executed based on client behavior of the client device to steer the client device to the respective wireless AP for increasing the throughput.

In embodiments, the client device is located at a first location, and the RSSI is a first RSSI. The plurality of wireless APs is prepared for steering the client device to the respective wireless AP, responsive to receiving an indication, from the cloud server, that the client device will move to a second location. It is determined that the client device moved to a third location different from the second location. Responsive to determining that the client device moved to the third location, a second RSSI of the client device is captured. The second RSSI is sent to the cloud server for training the machine learning model.

In embodiments, the client device is a first client device. It is determined that a second client device is a stationary client device. The machine learning model is trained to avoid steering the second client device.

In embodiments, features are extracted from client behavior of the client device. The features include RSSI metrics and distance metrics associated with times and days of week. The machine learning model is trained, based on the features, to steer the client device to the respective wireless AP for increasing the throughput.

In embodiments, it Is determined that a location of the client device matches an expected location based on the machine learning model. The machine learning model is updated based on the location of the client device.

The advantages and benefits of the methods, systems, and apparatuses disclosed herein include improving the speed of wireless connectivity for calling, video streaming, other streaming applications, and gaming compared to traditional methods. The disclosed methods reduce downlink and uplink times between clients and APs (APs) compared to traditional methods. The disclosed apparatuses increase steering performance in mesh networks to improve reliability compared to traditional apparatuses. The disclosed machine learning systems use client behavior to optimize the network performance between clients and APs and enable mesh networks to learn patterns for improving each client's performance. Moreover, the disclosed methods provide cost effective and low mobility over a specific coverage area.

The disclosed methods reduce the need to use the IEEE Std. 802.11k functionality, hence preserving client battery life. The disclosed apparatuses improve the likelihood that a client is connected to an appropriate wireless node to ensure optimal performance in the network. Moreover, the disclosed infrastructure can be decentralized (with no central server) or centrally managed (with a central server). Both implementations are relatively inexpensive, and can be very reliable and resilient, as each node needs only transmit as far as the next node. Nodes act as routers to transmit data from nearby nodes to peers that are too far away to reach in a single hop, resulting in a network that can span larger distances. The advantages of the convolutional neural network (CNN) used for machine learning (ML) in the disclosed embodiments include the obviation of feature extraction and the use of shared weight in convolutional layers, which means that the same filter (weights bank) is used for each node in the layer; this both reduces memory footprint and improves performance.

FIG. 1 is a block diagram illustrating an example wireless mesh network 100, in accordance with one or more embodiments. Network 100 is implemented using components of the example network access device 602, example wireless network 700, and example computer system 800 illustrated and described in more detail with reference to FIGS. 6, 7 and 8. Network 100 includes client device 108 and wireless access points (APs) 104, 112, 116. Network 100 does not include the cloud server 120 that is connected to AP 112.

Likewise, embodiments of the system can include different and/or additional components or can be connected in different ways.

Network 100 shown by FIG. 1 implements methods for client steering. With an increase in the number of Wi-Fi client devices, such as client device 108, traditional wireless methods can fail to match fixed broadband speeds because of issues relating to client devices and their movement within a home or office (e.g., the dashed lines in FIG. 1 show movement of client device 108). Client device 108 is a mobile phone, tablet, smartwatch, mobile IoT device, or laptop. At the start of a session, client device 108 connects to network 100 using one of the wireless APs 104, 112, 116, also choosing between the 5 Ghz, 2.4 Ghz, and 6 Ghz bands when available. An AP is a wireless networking hardware device that allows other Wi-Fi devices (e.g., AP 104, client device 108) to connect to a wired network. An AP can be a router, a Wi-Fi extender, or a Wi-Fi repeater.

Traditionally, the decision of which AP to connect to is usually based only on signal strength. Furthermore, client devices typically stick to the AP they initially latched onto as they move around the house. As client devices move around, a static AP connection is no longer optimal. A client device at one end of a building can still be connected to the original AP at the other, which has the effect of consuming much of the Wi-Fi airtime capacity and degrading the performance of all other client devices even if they are connected in high signal strength rooms. Throughput for all client devices can thus be severely degraded using traditional methods.

Client steering of client device 108 (as client device 108 moves as shown by the dashed lines in FIG. 1) to an optimal AP of the APs 104, 112, 116 extends the Wi-Fi performance and reliability capabilities of the network 100. Using the methods disclosed here, an optimal connection is selected for each client device and the connection is made invisibly to the users. The selection of AP per client device is updated periodically (e.g., every 2 seconds or every 15 seconds). In instances, the optimal connection is not be the closest AP with the strongest signal. There is no need for an app or client software since client steering is executed entirely by the network 100 and/or the cloud server 120. Hence, the disclosed systems operate with all Wi-Fi connected devices no matter how old.

In embodiments, a first wireless AP (e.g., AP 112) of the mesh network 100 transmits a quality of service (QoS) data packet to a client device (e.g., client device 108) of multiple client devices. A QoS data packet (sometimes referred to as a QoS data frame) typically has a value of 1 in the QoS subfield of the Subtype field (Bit7). Each of these data subtypes contains QoS in its name; the frame format is distinguished by the presence of a QoS Control field in the MAC header. In embodiments, another AP 104, 116 sends the QoS data packet to the client device 108.

The mesh network 100 includes multiple wireless APs including the first wireless AP 112. In embodiments, one of the APs 112, 104, 116 captures a received signal strength indication (RSSI) value of the client device 108 using the QoS data packet. In an IEEE 802.11 system, RSSI is the relative received signal strength in a wireless environment, in arbitrary units. RSSI is an indication of the power level being received by the receiving radio after the antenna and possible cable loss. RSSI is typically measured in dBm units. A greater negative value (in dBm) indicates a weaker signal. Therefore, an RSSI of −50 dBm is stronger than an RSSI of −60 dBm. The, the greater the RSSI value, the stronger the signal. Thus, when an RSSI value is represented in a negative form (e.g., −100), the closer the value is to 0, the stronger the received signal has been.

In embodiments, received channel power indicator (RCPI) is used for client steering instead of or in combination with RSSI. RCPI is an 802.11 measure of the received radio frequency power in a selected channel over the preamble and the entire received frame, and has defined absolute levels of accuracy and resolution. RCPI is exclusively associated with 802.11 and as such has some accuracy and resolution enforced on it through IEEE Std. 802.11k-2008. Received signal power level assessment is a necessary step in establishing a link for communication between wireless nodes.

An AP 104, 112, 116 determines a distance between the AP and the client device 108 using a Wi-Fi round trip time (Wi-Fi RTT). Wi-Fi RTT enables computing devices to measure the distance to nearby Wi-Fi access points (APs) and determine their indoor location with a precision of 1-2 meters (m) using round-trip delay. With three or more nearby APs 104, 112, 116, an AP can trilaterate client device 108's location with an accuracy of 1-2 meters (m). The technology operation principle is based on time delay in signal reception and transmission—the time necessary for sending a signal and the time required for receiving its confirmation are taken into account. The system calculates the time span and then multiplies it by the speed of light. An AP 104, 112, 116 further determines a time and day of week (e.g., 10 am PT on Sunday, or 3:42 pm ET on Tuesday) to associate with the RSSI and distance (or location of the client device 108). The association is performed to build a traffic pattern of client device 108 (as client devices 108 move as shown by the dashed lines in FIG. 1).

A machine learning (ML) model (e.g., ML model 516 illustrated and described in more detail with reference to FIG. 5) is used to identify a second wireless AP (e.g., AP 104) of the multiple wireless APs 104, 112, 116 for steering the client device 108 to. The identification is performed based on the RSSI, the distance, and the time and day of week. The ML model is trained to steer each client device of the multiple client devices to a respective wireless AP of the multiple wireless APs 104, 112, 116 for increasing a throughput of the mesh network 100 based on features extracted from client behavior of the multiple client devices. Feature extraction is illustrated and described in more detail with reference to FIG. 5.

In embodiments, the machine learning is performed on an AP. In embodiments, the machine learning is performed on cloud server 120. Cloud server 120 provides cloud computing functionality (on-demand availability of computer system resources, especially data storage and computing power). For example, data 128 can include extracted features (if feature extraction is performed on an AP) or the raw RSSI, distance, and time and day values. Data 132 can represent information describing how client device 108 should be steered or a prediction of how client device 108 will move at a particular time and day value (as shown by the dashed lines in FIG. 1). The identified second wireless AP 104 is connected to client device 108 to increase network and device throughput (as client device 108 moves).

In embodiments, data 128 describing the RSSI metrics and distance metrics associated with times and days of week for client device 108 (as client device 108 moves as shown by the dashed lines in FIG. 1) are sent to cloud server 120 for extracting features. Training the machine learning model is performed on the cloud server 120. In embodiments, the time and day of week determined is a first time and day of week. The wireless AP 112 or cloud server 120 determines a first location of the client device 108. Wireless AP 112 receives, from the cloud server 120, an indication that the client device 108 will move to a second location (shown by the dashed-line rectangle in FIG. 1) at a second time and day of week (e.g., Wednesday, 9:225 am Central Time) based on the machine learning model.

In embodiments, the time and day of week determined is a first time and day of week. AP 112 or the cloud server 120 determines the first location of client device 108. AP 112 or the cloud server 120 determines, based on the machine learning model, that the client device 108 will move to the second location at a second time and day of week. In embodiments, AP 112 or the cloud server 120 extracts features from the client behavior of the multiple client devices. The features include RSSI metrics and distance metrics associated with times and days of week. AP 112 or the cloud server 120 train the machine learning model, based on the features, to steer each client device to the respective wireless AP for increasing the throughput. The feature extraction and machine learning technology implemented is illustrated and described in more detail with reference to FIG. 5.

Figure 2:
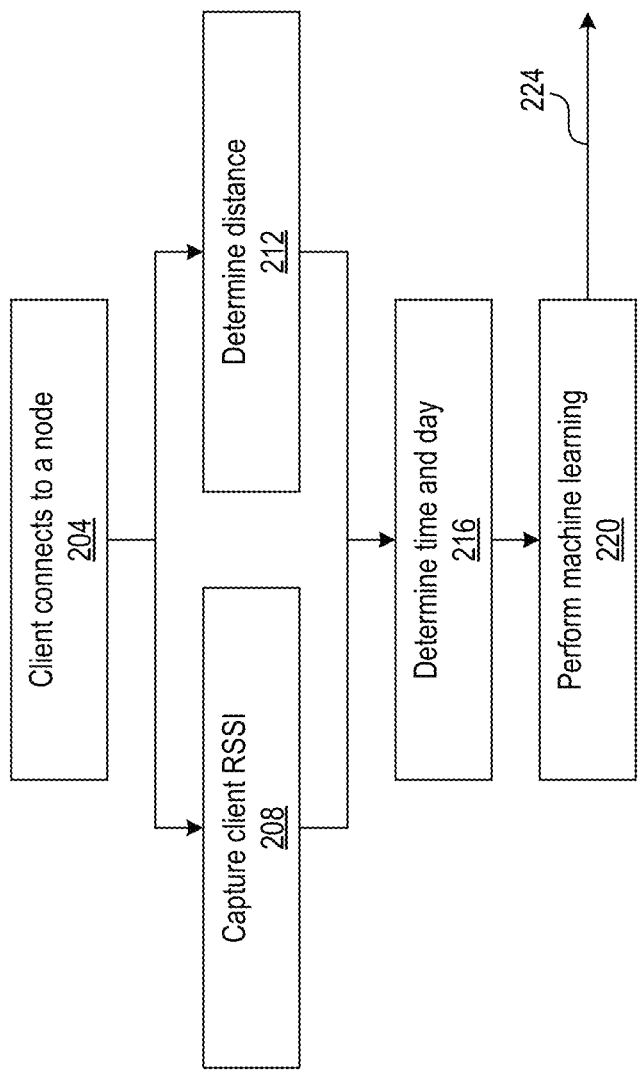
FIG. 2 is a flow diagram illustrating an example process for intelligent client steering in wireless mesh networks, in accordance with one or more embodiments.

FIG. 2 is a flow diagram illustrating an example process for intelligent client steering in wireless mesh networks, in accordance with one or more embodiments. An example wireless mesh network 100 is illustrated and described in more detail with reference to FIG. 1. In embodiments, the process of FIG. 2 is performed by wireless AP 112 or cloud server 120 illustrated and described in more detail with reference to FIG. 1. In embodiments, the process of FIG. 2 is performed by a computer system, e.g., the example computer system 800 illustrated and described in more detail with reference to FIG. 8. Likewise, embodiments can include different and/or additional steps or can perform the steps in different orders.

In step 204, an AP determines that client device 108 is connected to mesh network 100 for a first time. The steps herein can be performed by a single AP, different APs, or cloud server 120. Client device 108 is illustrated and described in more detail with reference to FIG. 1. Mesh network 100 includes multiple wireless APs. In embodiments, determining that client device 108 is connected to the wireless AP for the first time includes determining absence of an identifier of the client device 108 in a list of client devices maintained by the mesh network 100. For example, the identifier is an International Mobile Equipment Identity (IMEI) number (a 15-digit number unique to each device), a phone number, an Identifier for Advertisers (IDFA) number, a MAC address, a CPU Serial Number, an HDD Serial Number, etc.

An AP transmits a QoS data packet to the client device 108. In step 208, an AP captures an RSSI of the client device 108 using the QoS data packet. In embodiments, transmitting the QoS data packet is performed responsive to booting of the wireless AP. The AP is initiated via hardware such as a button or by a software command. A process loads software into memory of the AP before it can be executed. The loading is done by hardware or firmware in a processor. Booting the AP can be "hard," e.g., after electrical power is switched from off to on, or "soft," where the power is not cut. A soft boot can clear RAM to zero. In embodiments, the AP does not run a noticeable boot sequence to begin functioning, and when turned on can simply run operational programs that are stored in ROM. In embodiments, the AP is rebooted to return to a designated zero-state from an unintended, locked state. The boot process can also load a storage dump program for diagnosing problems in the AP.

In step 212, an AP determines a distance between the wireless AP and the client device 108. In step 216, an AP determines a time and day of week. In step 220, AP 112 sends the RSSI, the distance, and the time and day of week to cloud server 120 for training a machine learning model to steer the client device 108 (as client device 108 moves as shown by the dashed lines in FIG. 1) to a respective wireless AP of the multiple wireless APs for increasing a throughput of the mesh network 100 based on the RSSI, the distance, and the time and day of week. Output 224 of the process is used by AP 112 or cloud server 120 to identify an optimal AP for the device 108 to connect to, a predicted physical movement of device 108, etc. Output 224 can also include information describing the actual AP that the client 108 was connected to at different times.

Figure 3:
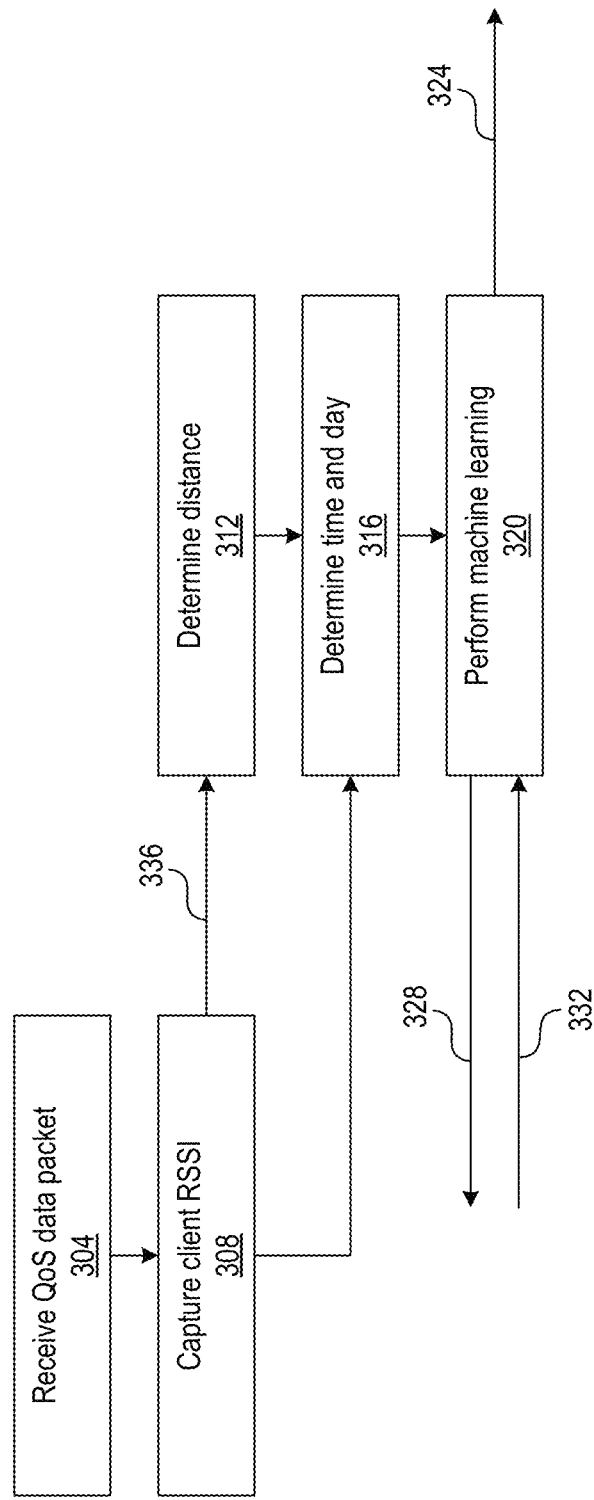
FIG. 3 is a flow diagram illustrating an example process for intelligent client steering in mesh networks, in accordance with one or more embodiments.

FIG. 3 is a flow diagram illustrating an example process for intelligent client steering in mesh networks, in accordance with one or more embodiments. An example wireless mesh network 100 is illustrated and described in more detail with reference to FIG. 1. In embodiments, the process of FIG. 3 is performed by wireless AP 112 or cloud server 120 illustrated and described in more detail with reference to FIG. 1. The steps herein can be performed by a single AP, different APs, or cloud server 120. In embodiments, the process of FIG. 3 is performed by a computer system, e.g., the example computer system 800 illustrated and described in more detail with reference to FIG. 8. Likewise, embodiments can include different and/or additional steps or can perform the steps in different orders.

In step 304, an AP transmits a QoS data packet to client device 108 or multiple client devices. In embodiments, transmitting the QoS data packet is performed responsive to booting of the wireless AP. For example, the AP has previously captured a first RSSI value, e.g., −100 dBm, −90 dBm, or −80 dBm. The AP periodically transmits the QoS data packet or a different QoS data packet to the client device 108. In step 308, an AP captures a second RSSI (e.g., −60 dBm, −50 dBm, or −40 dBm) of the client device 108 using the periodically transmitted QoS data packet. The AP determines a difference 336 (e.g., −10 dBm, −5 dBm, or −1 dBm) between the first RSSI and the second RSSI. Responsive to the difference 336 exceeding a threshold difference (e.g., −20 dBm or −5 dBm), the AP can send the difference 336 to cloud server 120 for training a machine learning model. The machine learning model is trained as illustrated and described with reference to FIG. 5.

In embodiments, while a first client device (e.g., client device 108) can move at different times, the AP determines that a second client device is a stationary client device (e.g., a W-Fi extender). The AP or cloud 120 configure the machine learning model to avoid steering the second client device. That is the second client device is always connected to the same AP.

In some examples, the difference 336 exceeds a threshold difference, i.e., there is a significant difference between the first RSSI and the second RSSI. Control of the process moves to step 312. In step 312, the AP determines a distance between the AP and the client device 108 using a Wi-Fi round trip time (Wi-Fi RTT) as described in more detail with reference to FIG. 1. Wi-Fi RTT enables computing devices to measure the distance to nearby Wi-Fi access points (APs) and determine their indoor location with a precision of 1-2 meters (m) using round-trip delay. With three or more nearby APs 104, 112, 116, an AP can trilaterate client device 108's location with an accuracy of 1-2 meters (m).

In some examples, the difference 336 does not exceed the threshold difference, i.e., there is no significant difference between the first RSSI and the second RSSI. Control of the process moves directly from step 308 to step 316. In step 316, the AP determines a time and day of week (e.g., 10 am PT on Sunday, or 3:42 pm ET on Tuesday) to associate with the second RSSI and the distance (or location of the client device 108). The association is performed to build a traffic pattern of client device 108 (as client devices 108 move as shown by the dashed lines in FIG. 1). In some embodiments, step 316 is performed directly after performing step 308 and without performing step 312.

In step 320, machine learning is performed on the AP or on cloud server 120. Cloud server 120 provides cloud computing functionality (on-demand availability of computer system resources, especially data storage and computing power). For example, data 328 can include extracted features (if feature extraction is performed on an AP) or the raw RSSI, distance, and time and day values. Data 328 can also include information describing the actual AP that the client 108 was connected to at different times. Data 332 can represent information describing how client device 108 should be steered or a prediction of how client device 108 will move at a particular time and day value (as shown by the dashed lines in FIG. 1). An identified second wireless AP is connected to client device 108 to increase network and device throughput (as client device 108 moves).

In embodiments, data 328 describing the RSSI metrics and distance metrics associated with times and days of week for client device 108 (as client device 108 moves as shown by the dashed lines in FIG. 1) are sent to cloud server 120 for extracting features. Training the machine learning model is performed on the cloud server 120. For example, features are extracted from the client behavior of the client devices, wherein the features include RSSI metrics and distance metrics associated with times and days of week. Training the machine learning model is performed, based on the features, to steer each client device to a respective wireless AP for increasing the throughput.

Data 328 can also include a request from an AP to cloud 120 for location behavior data, historical RSSI values, or historical distance values of client 108 that are stored on cloud 120. Data 332 can include historical location data, historical RSSI values, or historical distance values of client 108 that are stored on cloud 120. Data 324 can include outputs of the machine learning performed to identify an optimal AP for the device 108 to connect to, a predicted physical movement of device 108, etc. Data 324 can be sent to the cloud 120 or to other APs for client steering.

Figure 4:
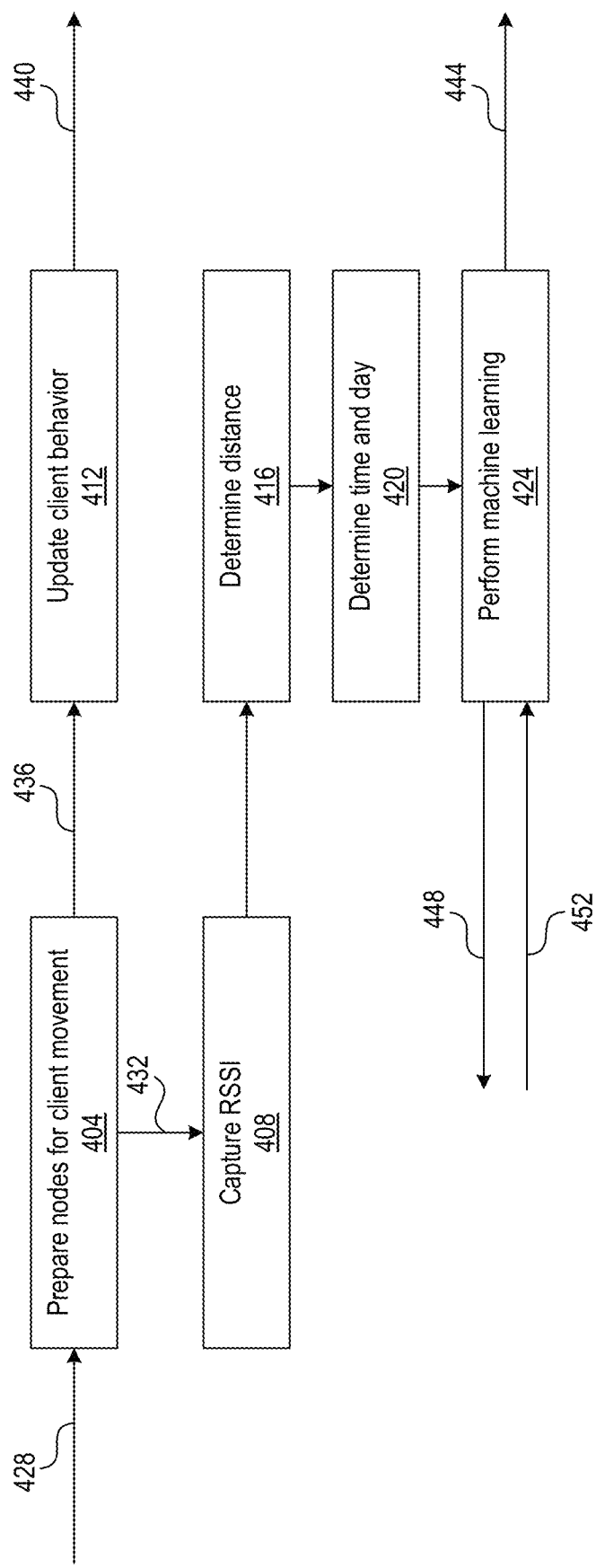
FIG. 4 is a flow diagram illustrating an example process for intelligent client steering in mesh networks, in accordance with one or more embodiments.

FIG. 4 is a flow diagram illustrating an example process for intelligent client steering in mesh networks, in accordance with one or more embodiments. An example wireless mesh network 100 is illustrated and described in more detail with reference to FIG. 1. In some embodiments, the process of FIG. 4 is performed by wireless AP 112. Wireless AP 112 is illustrated and described in more detail with reference to FIG. 1. In other embodiments, the process of FIG. 4 is performed by a computer system, e.g., the example computer system 800 illustrated and described in more detail with reference to FIG. 8. Likewise, embodiments can include different and/or additional steps or can perform the steps in different orders.

In some embodiments, an AP receives, from cloud server 120, expected client behavioral and location data 428 or a trained machine learning model. When a machine learning model is received, the AP executes the machine learning model based on client behavior of client device 108 to steer client device 108 to an optimal respective wireless AP for increasing throughput of network 100. For example, cloud 120 sends client behavioral and location data 428 (e.g., RSSI values, historical locations, distances of client 108 from APs) to an AP to prepare the AP for steering the client 108 due to predicted changes in location of client 108. In step 404, client device 108 is located at a first location, and a first RSSI has been captured from client 108. The AP prepares itself as well as the other APs for steering client device 108 to an optimal wireless AP, responsive to receiving an indication, from cloud server 120, that client device 108 will move to a second location.

In some examples, the AP determines that an observed location of client device 108 matches an expected location based on a received trained machine learning model and/or expected/predicted client behavioral and location data 428. In step 412, the AP updates the machine learning model based on the observed location of the client device 108. In some examples, the AP determines that the observed data 436 in terms of movement and locations of client device 108 matches the expected/predicted client behavioral and location data 428 (e.g., a predicted second location). That is, client device 108 moved or did not move as expected based on previous machine learning data. In step 412, the AP updates the client behavioral and location data 428 and/or a machine learning model (e.g., weight banks) and send the updated client behavioral and location data 440 to cloud 120. In some instances, cloud 120 uses the updated client behavioral and location data 440 to update a machine learning model maintained on cloud 120.

In some examples, the AP determines that the observed data 432 in terms of movement and locations of client device 108 mismatches the expected/predicted client behavioral and location data 428 (e.g., a predicted second location). For example, the AP determines that client device 108 moved to an unexpected third location different from the predicted second location. Responsive to determining that client device 108 moved to the unexpected third location, the AP captures a second RSSI of client device 108 in step 408. The AP either performs machine learning to update/train a machine learning model or sends the second RSSI to cloud server 120 for training the machine learning model.

In some examples, a first QoS data packet has been sent, a first RSSI has been determines, and a first distance of client device 108 from the AP has been determined. The AP determines that an observed location of client device 108 mismatches an expected location based on (1) features extracted from the first RSSI and/or first distance, (2) a received, trained machine learning model, or (3) the expected/predicted client behavioral and location data 428. Responsive to determining that the observed location mismatches the expected location, the AP transmits a second QoS data packet to client device 108 for capturing a second RSSI of client device 108 using the second QoS data packet in step 408.

In step 416, the AP determines a second distance between the AP and client device 108. Optionally, in step 420, the AP determines a time and day of week (e.g., 10 am PT on Sunday, or 3:42 pm ET on Tuesday) to associate with the second RSSI and the distance (or location of the client device 108). The association is performed to build a traffic pattern of client device 108 (as client devices 108 move as shown by the dashed lines in FIG. 1). In some embodiments, step 420 is performed directly after performing step 408 and before/without performing step 416. In step 424, the AP trains the machine learning model, based on the second RSSI and the second distance, to steer the client device 108 for increasing the throughput of network 100. For example, the AP connects another wireless AP to client device 108.

Connecting the second wireless AP to the client device 108 can avoid null spots within the mesh network.

The AP can send request 448 to cloud 120 to obtain expected/predicted client behavioral and location data 428 (e.g., a predicted future location). The data 452 sent by cloud 120 to the AP can include a trained machine learning model or expected/predicted client behavioral and location data. The data 444 includes an updated machine learning model, extracted features, or updated client behavioral and location data. Data 444 can also include information describing the actual AP that the client 108 was connected to at different times.

Figure 5:
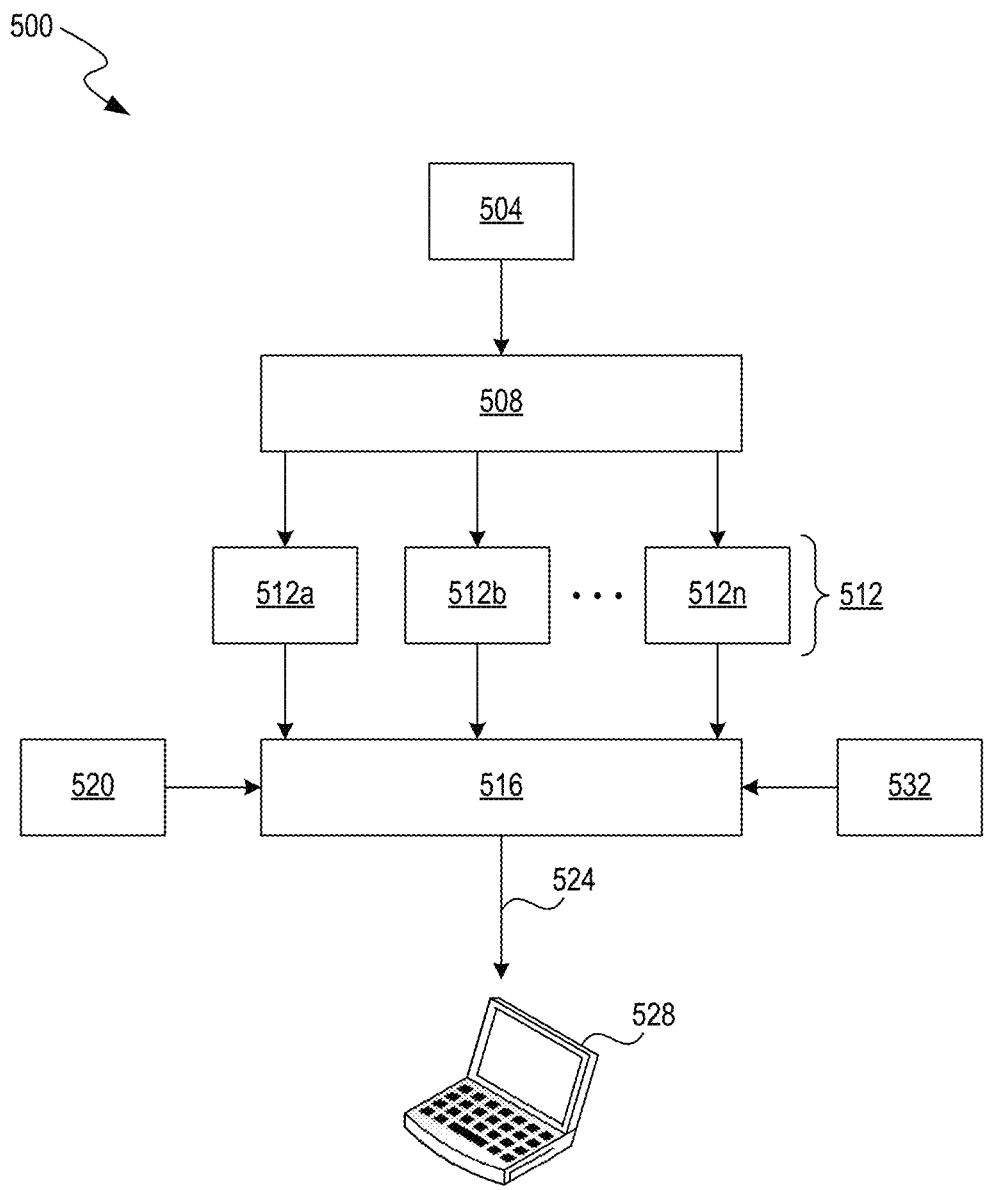
FIG. 5 is a block diagram illustrating an example machine learning (ML) system, in accordance with one or more embodiments.

FIG. 5 is a block diagram illustrating an example ML system 500, in accordance with one or more embodiments. The ML system 500 is implemented using components of the example computer system 800 illustrated and described in more detail with reference to FIG. 8. For example, the ML system 500 can be implemented on the computer system 800 using instructions programmed in the non-volatile memory 810 illustrated and described in more detail with reference to FIG. 8. Likewise, embodiments of the ML system 500 can include different and/or additional components or be connected in different ways. The ML system 500 is sometimes referred to as a ML module.

The ML system 500 includes a feature extraction module 508 implemented using components of the example computer system 1000 illustrated and described in more detail with reference to FIG. 6. In some embodiments, the feature extraction module 908 extracts a feature vector 912 from input data 904. The feature vector 912 includes features 912a, 912b, . . . , 912n. The feature extraction module 908 reduces the redundancy in the input data 904, e.g., repetitive data values, to transform the input data 904 into the reduced set of features 912, e.g., features 912a, 912b, . . . , 912n. The feature vector 912 contains the relevant information from the input data 904, such that events or data value thresholds of interest can be identified by the ML model 916 by using this reduced representation. In some example embodiments, the following dimensionality reduction techniques are used by the feature extraction module 908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 916 performs deep learning (also known as deep structured learning or hierarchical learning) directly on the input data 904 to learn data representations, as opposed to using task-specific algorithms. In deep learning, no explicit feature extraction is performed; the features 912 are implicitly extracted by the ML system 900. For example, the ML model 916 can use a cascade of multiple layers of nonlinear processing units for implicit feature extraction and transformation. Each successive layer uses the output from the previous layer as input. The ML model 916 can thus learn in supervised (e.g., classification) and/or unsupervised (e.g., pattern analysis) modes. The ML model 916 can learn multiple levels of representations that correspond to different levels of abstraction, wherein the different levels form a hierarchy of concepts. In this manner, the ML model 916 can be configured to differentiate features of interest from background features.

In alternative example embodiments, the ML model 916, e.g., in the form of a CNN generates the output 924, without the need for feature extraction, directly from the input data 204. The output 924 is provided to the video displays 1018 illustrated and described in more detail with reference to FIG. 10. The computer device 928 can be a server, laptop, desktop, computer, tablet, smartphone, smart speaker, etc., implemented using components of the example computer system 1000 illustrated and described in more detail with reference to FIG. 10. In some embodiments, the steps performed by the ML system 900 are stored on non-volatile memory 1010 for execution. In other embodiments, the output 924 is displayed on the computer device 928.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 916 can be a CNN that includes both convolutional layers and max pooling layers. The architecture of the ML model 916 can be "fully convolutional," which means that variable sized sensor data vectors can be fed into it. For all convolutional layers, the ML model 916 can specify a kernel size, a stride of the convolution, and an amount of zero padding applied to the input of that layer. For the pooling layers, the model 916 can specify the kernel size and stride of the pooling.

In some embodiments, the ML system 900 trains the ML model 916, based on the training data 920, to correlate the feature vector 912 to expected outputs in the training data 920. As part of the training of the ML model 916, the ML system 900 forms a training set of features and training labels by identifying a positive training set of features that have been determined to have a desired property in question, and, in some embodiments, forms a negative training set of features that lack the property in question.

The ML system 900 applies ML techniques to train the ML model 916, that when applied to the feature vector 912, outputs indications of whether the feature vector 912 has an associated desired property or properties, such as a probability that the feature vector 912 has a particular Boolean property, or an estimated value of a scalar property. The ML system 900 can further apply dimensionality reduction (e.g., via linear discriminant analysis (LDA), PCA, or the like) to reduce the amount of data in the feature vector 912 to a smaller, more representative set of data.

The ML system 900 can use supervised ML to train the ML model 916, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 932 is formed of additional features, other than those in the training data 920, which have already been determined to have or to lack the property in question. The ML system 900 applies the trained ML model 916 to the features of the validation set 932 to quantify the accuracy of the ML model 916. Common metrics applied in accuracy measurement include: Precision and Recall, where Precision refers to a number of results the ML model 916 correctly predicted out of the total it predicted, and Recall is a number of results the ML model 916 correctly predicted out of the total number of features that had the desired property in question. In some embodiments, the ML system 900 iteratively re-trains the ML model 916 until the occurrence of a stopping condition, such as the accuracy measurement indication that the ML model 916 is sufficiently accurate, or a number of training rounds having taken place. The validation set 932 can be generated based on analysis to be performed.

Figure 6:
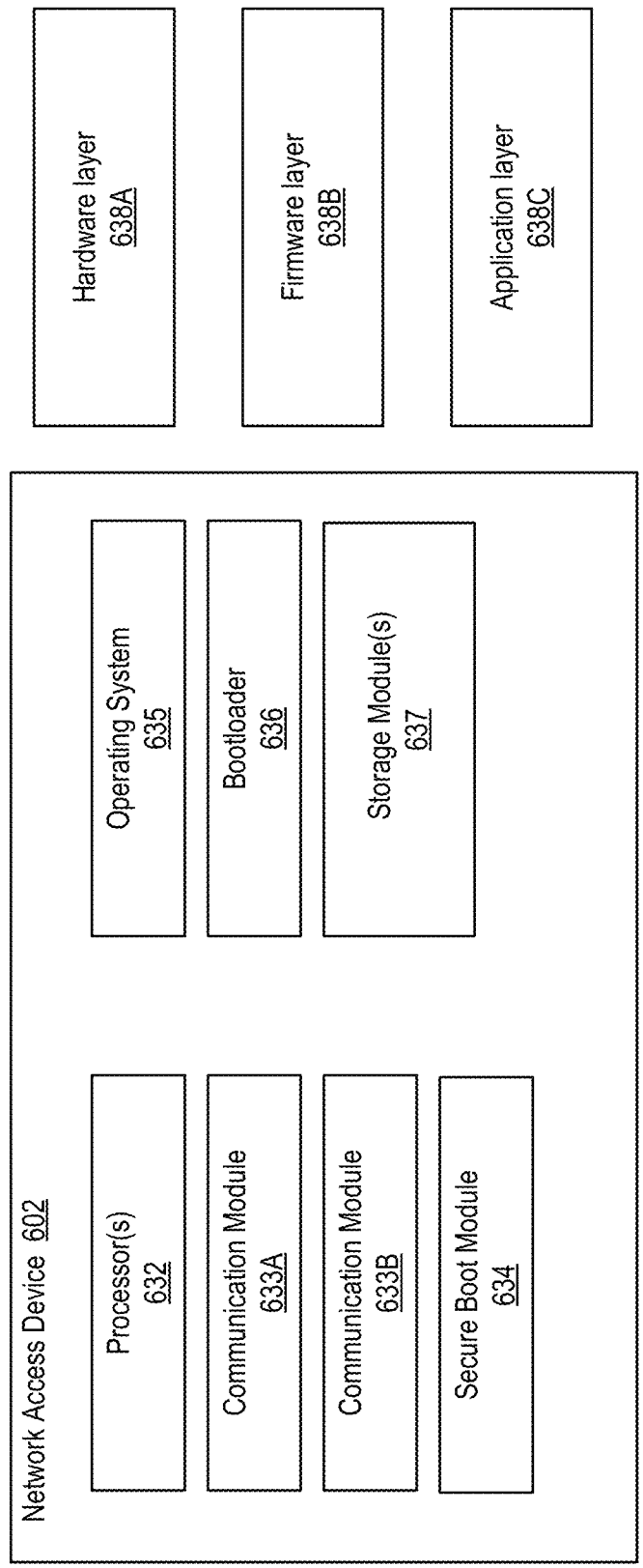
FIG. 6 is a block diagram illustrating an example network access device in accordance with one or more embodiments.
Figure 7:
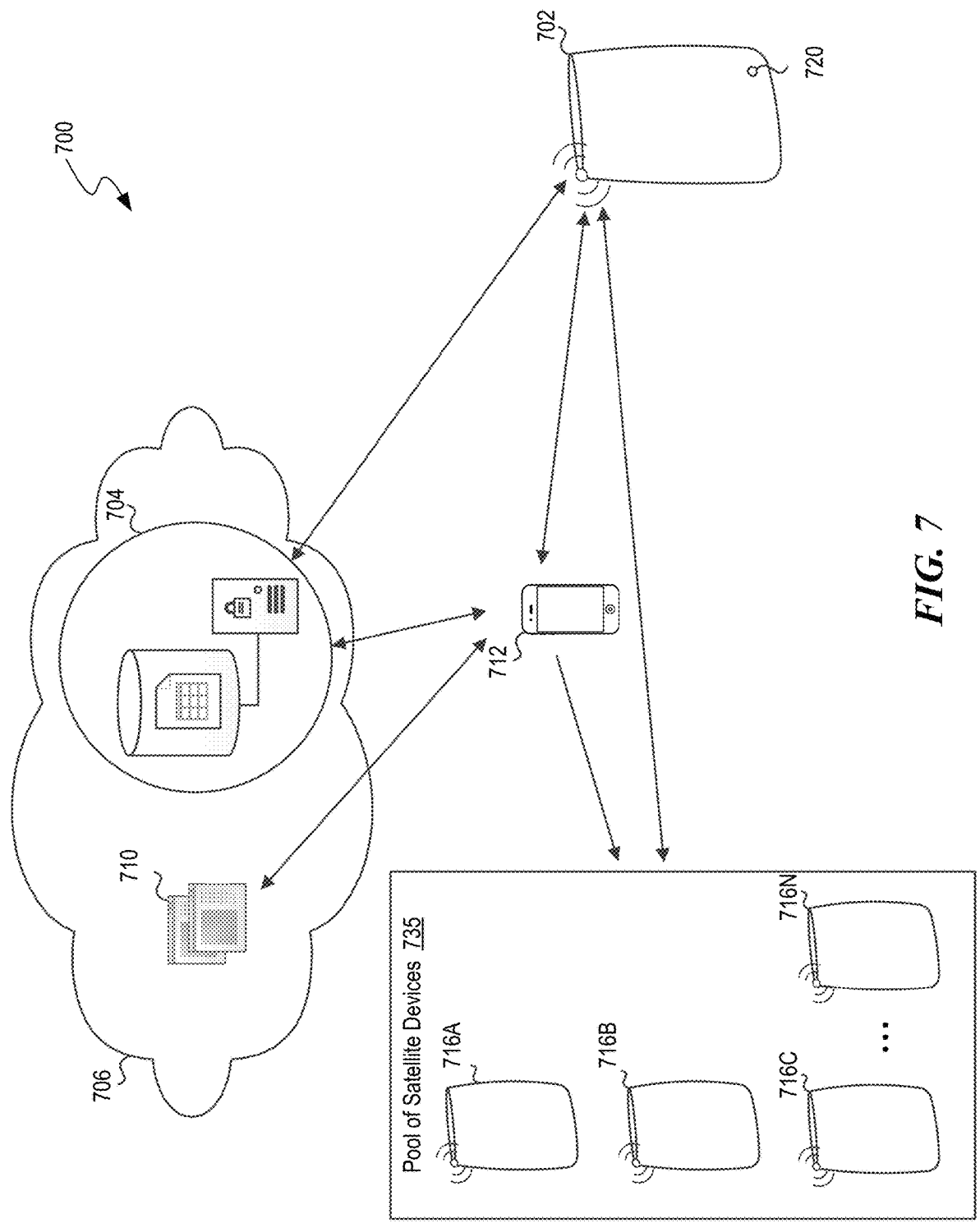
FIG. 7 is a drawing illustrating an example network environment, in accordance with one or more embodiments.

FIG. 6 is a block diagram illustrating an example network access device 602 in accordance with one or more embodiments. In embodiments, the network access device 602 facilitates connections between electronic devices (e.g., personal computers, mobile phones, wearable items) and a network. The network access device 602 may be, for example, a router, modem, switch, AP (AP), etc. Some embodiments are described in the context of a router for purpose of illustration only. Those skilled in the art will recognize that similar technology may be used in conjunction with other types of network access devices. Network access device 602 may be, for example, AP 112 of FIG. 1. Network access device 602 is implemented using the components of the example computer system 800 illustrated and described in more detail with reference to FIG. 8. Likewise, embodiments of network access device 602 can include different and/or additional components or can be connected in different ways.

Network access device 1102 can include one or more processors 1132, communication module(s) 1133A-B, a secure boot module 1134, an operating system 1135, a bootloader 1136, and one or more storage modules 1137.

Processor(s) 1132 can execute instructions stored in the storage module(s) 1137, which can be any device or mechanism capable of storing information. In some embodiments a single storage module includes multiple computer programs for performing different operations (e.g., establishing a communication channel with an electronic device, examining data packets within received traffic, etc.), while in other embodiments each computer program is hosted within a separate storage module.

In some embodiments, the network access device 1102 may include at least three layers; a hardware layer 1138A, a firmware layer 1138B, and an application layer 1138C. The hardware layer 1138A of a network access device 1102 may include the physical chipset-level of the network access device. A boot certificate (also referred to as a "birth certificate") may be "sewn" or "burned" into the hardware layer 1138A of the network access device 1102. For example, the boot certificate may be burned in a chipset-level location within the hardware layer 1138A of the network access device. The boot certificate may include registration information that can be embedded within a secure, chipset-level location known only to the manufacturer.

The boot certificate may include information indicative of identifying the network access device 1102. The boot certificate may include a serial number, license key, or other identifying information to identify the network access device 1102. The boot certificate may verify physical ownership of the network access device 1102, as the boot certificate may be physically stored on the hardware layer 1138A of the network access device 1102.

The hardware layer 1138A of the network access device 1102 may include a hash key programmed in one-time programmable (OTP) memory. OTP memory may include non-volatile memory that permits data be written to memory only once. OTP memory may be utilized during manufacturing of the network access device 1102 to upload firmware onto the network access device 1102. In some embodiments, if the network access device 1102 receives firmware, the OTP memory can upload the firmware to the network access device 1102. The OTP memory may include the boot certificate. When the network access device 1102 leaves a manufacturing facility, the network access device 1102 may include a birth certificate and firmware signed with an intermediate digital certificate.

The network access device 1102 may include a firmware layer 1138B. The firmware layer 1138B may require that any firmware installed onto the network access device 1102 be digitally signed to prevent any unauthorized entity from accessing and/or installing firmware onto the network access device.

In some embodiments, the network-accessible server system may periodically transmit updated firmware to the network access device 1102. Each time updated firmware is transmitted from the network-accessible server system, the network-accessible server system may digitally sign the updated firmware.

The network access device 1102 may include an application layer 1138C. The application layer 1138C may facilitate interaction with a mobile application to modify the settings of the network access device 1102. The application layer 1138C may include applications that can be read by, for example, a secure boot module 1134. These applications can be developed by the manufacturer or a third party. While a mobile application may connect to the application layer 1138C of the network access device 1102, the application layer may be prevented from being activated until after the network access device 1102 verifies that the application has been signed by the manufacturer. The application layer 1138C may not connect to the mobile application until a digital certificate is distributed to the network access device 1102.

The network access device 1102 may include one or more communication modules 1133A-B. Here, for example, the network access device 1102 includes multiple communication modules 1133A, 1133B, which may be designed to communicate in accordance with different communication protocols. However, the network access device 1102 could include a single communication module capable of communicating in accordance with multiple communication protocols or communicating along separate threads and/or frequency bands in accordance with a single communication protocol. The communication module(s) 1133A-B can facilitate communication between various components of the network access device 1102. Generally, the communication module(s) 1133A-B communicate with other electronic device(s) by transmitting data wirelessly via an antenna. In some embodiments, the network access device 1102 includes multiple antennas designed for communicating in accordance with various communication protocols described herein.

A first communication module 1133A may route and/or forward network traffic between one or more electronic devices and a network, such as the Internet. For example, the communication module 1133A may facilitate electronic communication with a mobile phone, tablet computer, or wearable item seeking to establish a connection with a network to which the network access device 1102 is connected.

A second communication module 1133B may route and/or forward local data packets between a computer program executing on an electronic device and a manufacturer platform executing on a network-accessible server system. The local data packets received at the network access device 1102 may include provisioning and settings customization of the network access device 1102. In some embodiments, the second communication module 1133B may utilize a short-range wireless communication protocol to communicate with the computer program.

The secure boot module 1134 can be configured to, upon startup, verify that firmware residing on the network access device 1102 has been digitally signed. For example, the secure boot module 1134 may examine the signature of the bootloader 1136 to verify that it hasn't been modified. If the bootloader 1136 is fully intact, the secure boot module 1134 may permit the bootloader 1136 to initiate the operating system 1135.

Upon initialization of an acquired device (e.g., a network access device), the network access device may be onboarded onto a network. A manufacturer-authorized device may onboard and provision the network access device. An example of a manufacturer-authorized device is a computing device that is authorized by the manufacturer to securely provision and boot a device, such as a network-accessible server system. A network access device, such as a router, may initially connect to the manufacturer-authorized device during the start-up or initialization process (e.g., upon booting). When the network access device connects to the manufacturer-authorized device, the manufacturer-authorized device may authenticate the network access device. Authenticating the network access device may include inspecting the network access device to verify the identity of the network access device.

Generally, network access devices, during initialization, may be vulnerable to unauthorized access. A remote entity may attempt to access the network access device or transmit malware to the network access device upon boot. To address such vulnerabilities, network access devices may include authorization by a manufacturer-authorized device before the network access device is permitted to connect to a network.

Additionally, in many areas where a network access device is provisioned, there may be insufficient coverage to allow for the electronic device to communicate with a cellular node over a wireless cellular network. If the electronic device is unable to connect to a wireless cellular network and transmit a request to the manufacturer-authorized device, the secure boot process initiated by the network access device may be unsuccessful.

To address the inconsistent coverage of an electronic device to connect to a wireless network, a network-accessible server system may establish a geographical location of the network access device and a geographical location of an electronic device and determine that the geographical location of the network access device and the geographical location of the electronic device are within a predetermined proximity of one another. In some embodiments, establishing the geographical location of the electronic device includes examining an Internet Protocol (IP) address of the network access device. In other embodiments, determining that the network access device and the electronic device are communicatively coupled via a short-range wireless communication protocol, such as Bluetooth®, for example. This allows the network-accessible server system to determine that the electronic device is within a certain proximity of the network access device due to the connectivity range limits on such a short-range wireless communication protocol.

FIG. 12 is a drawing illustrating an example network environment 700, in accordance with one or more embodiments. The network environment 700 includes one or more satellite networking devices (or simply "satellite devices"), consistent with various embodiments. In accordance with embodiments herein, a satellite device is a network-enabled device that is configured to forward network data between the network access device and local electronic devices connected to the satellite device. In an embodiment, the satellite device may be configured to direct network data to the network access device, where the network access device transmits/receives network data from the network, such as the Internet. Typically, the satellite device is used to improve the existing abilities of the network access device by extending the range or improving the signal strength of a network and so on.

In an embodiment, the environment 700 may include a network access device 1202, a computer program 1210 executing on an electronic device 1212, a network-accessible server system 1204, and at least one satellite device (e.g., 1216A-N from a pool of satellite devices 1235). It should be appreciated that a typical networked environment (house, building) may have one or two satellite devices. However, an embodiment contemplates many satellite devices, such as N number of devices as depicted by Nth satellite device 1216N. In an embodiment, network-accessible server system 1204 includes a management platform (not shown), which is communicably connected to any of, all of, or any combination of: computer program 1210, an application on network access device 1202 (not shown), and an application on at least one satellite device 1216A-N. Thus, any reference herein to network-accessible server system 1204 may include the management platform.

In some embodiments, a satellite device, such as first satellite device 1216A, may be configured to facilitate communication between electronic devices (e.g., personal computers, mobile phones, wearable items) and a network. For example, and in an embodiment, first satellite device 1216A is configured to communicate with computer program 1210 on electronic device 1212. First satellite device 1216A may be configured and used to improve the existing abilities of the network access device 1202 by extending the range or improving the signal strength of the network.

Any satellite device 1216A-N may communicatively couple to the network access device 1202, and the network access device 1202 may direct network data transmitted by such satellite devices. Satellite device(s) 1216A-N may communicate with the network access device 1202 via a suitable wireless communication protocol as described herein. Also, in an embodiment, any satellite device in the pool of satellite devices 1235 may communicatively couple to another and different satellite device in the pool satellite devices 1235 for the purposes of communicating with the network access device 1202. For example, first satellite device 1216A and second satellite device 1216B may be configured in a series topology, and so on. In this example, second satellite device 1216B sends data that is intended for network access device 1202 directly to first satellite device 1216A, first, and first satellite device 1216A forwards the data on to network access device 1202.

The network access device 1202 may connect to one or more satellite device(s) 1216A-N. Each satellite device (e.g., first satellite device 1216A) communicably connected to the network access device 1202 may be identifiable by the network access device 1202. The network access device 1202 may receive identification information from the satellite device (e.g., first satellite device 1216A) upon being communicably connected to the satellite device. Identification information may include a boot certificate of the satellite device (e.g., first satellite device 1216A), where the boot certificate is stored in the satellite device, for example. Or, the identification may include permission to access the boot certificate related information in storage in the manufacturer's cloud system. Identification information may include a satellite device serial number or IP address, for example.

One or more satellite devices may connect to the network access device 1202 via a tree network topology. In a tree topology, each satellite device is configured to transmit network data to each of the other satellite devices and to the network access device. The network access device 1202 is configured to transmit the network data to the network. First satellite device 1216A, second satellite device 1216B, and third satellite device 1216C are each communicably connected to network access device 1202 via network 1204D. in addition, first satellite device 1216A is communicably connected to second satellite device 1216B via wireless communication and to the third satellite device 1216C via wireless communication. Second satellite device 1216B also is communicably connected to third satellite device 1216C via wireless communication. Network access device 1202 may be configured to further transmit the network data to the network (not shown). Multiple satellite devices may be interconnected, where each satellite device forwards network data through the tree network to the network access device 1202. Multiple satellite devices may be interconnected across a tree network environment, such as a building, for example. The tree network may allow for multiple satellite devices to be interconnected, where the range of the wireless network may be extended due to the interconnectivity of multiple satellite devices located across the network environment.

One or more satellite devices may connect to the network access device 1202 via a hub-and-spoke or star topology. In a hub-and-spoke topology, each satellite device is configured to transmit network data to the network access device and the network access device is configured to transmit the network data to the network. First satellite device 1216A is communicably connected to network access device 1202 via a first wireless communication. Second satellite device 1216B is communicably connected to network access device 1202 via a second wireless communication. Third satellite device 1216C is communicably connected to network access device 1202 via a third wireless communication. Network access device 1202 is configured to further transmit the network data to the network (not shown).

An electronic device 1212 may communicatively couple to one or more satellite devices 1216A-N. For example, the electronic device 1212 may connect to the first satellite device 1216A or the second satellite device 1216B. In an embodiment, the electronic device may communicably connect to the satellite devices of the pool of satellite devices via a separate connection with each satellite device. For example, electronic device 1212 may connect to the first satellite device 1216A and connect to the second satellite device 1216B via separate connections (not shown) over a network. The first satellite device 1216A may receive network data from the electronic device 1212 and direct the network data to the network access device 1202. In a tree network architecture/topology, one satellite device may receive network data from another satellite device that was originally from electronic device over network and forward the network data to the network access device. For instance, the first satellite device 1216A may receive network data from second satellite device 1216B, who originally received the network data from electronic device 1212, and the first satellite device 1216A may forward the network data to the network access device 1202. In an embodiment, electronic device 1212 may also communicably connect to the network-accessible server system 1204 via the network. Network can represent communication using networking protocol or it can represent cellular protocols. Or, network can represent communication using both types of protocols. One skilled in the art can understand which protocol is being used, depending on the context. Further, electronic device 1212 and network access device 1202 may be communicably connected via a network. In an embodiment, network-accessible server system 1204 is communicably connected to network access device 1202.

An embodiment of a high-level process for onboarding or booting a satellite device can be understood with reference to FIG. 12. It should be appreciated that the particulars are for illustrative purposes and are not meant to be limiting. For purposes of discussion, it is assumed that second satellite device 1216B has not yet been provisioned, but a user desires to do so. Second satellite device 1216B becomes alive, for example by the user turning on the device. It should further be appreciated that second satellite device 1216B does not connect to any port of network access device 1202 and, therefore, does not have or obtain Internet connectivity of its own.

Upon activation, second satellite device 1216B electronically communicates with electronic device 1220, which is within a predetermined range or proximity, by way of short-range wireless communication protocol, such as Bluetooth® Low Energy (BLE), for example. More specifically, second satellite device 1216B is configured to communicate with computer program 1210 and computer program 1210 is also configured to receive and process communication from second satellite device 1216B. In an embodiment, second satellite device 1216B was previously provisioned, e.g., by the manufacturer, with a unique certificate. That is, a satellite boot certificate (also referred to as a satellite "birth certificate") may have been embedded, e.g., sewn or burned, into the hardware layer of second satellite device 1216B. The satellite boot certificate may include registration information that can be embedded within a secure, chipset-level location known only to the manufacturer. Thus, in response to being activated, second satellite device 1216B transmits its satellite boot certificate to computer program 1222. In another embodiment, the registration information of second satellite device 1216B stored on any of the devices in the environment, such as network-accessible server system 1204, electronic device 1220, or network access device 1202. It should be appreciated that upon activation, second satellite device 1216B may also send signals to network access device 1202, however, network access device 1202 can be configured to ignore such signals until certain conditions are met as described below.

Upon receipt of the satellite boot certificate, computer program 1210 transmits the satellite birth certificate and appropriate credentials of computer program 1210 to network-accessible server system 1204. In a different embodiment, upon a type of notification, computer program 1210 transmits data, identifying that the user is in possession of second satellite device 1216B, to network-accessible server system 1204. For example, a user can take a photograph of the serial number of the second satellite device 1216B and transmit the photograph along with the appropriate credentials of computer program 1210 to network-accessible server system 1204. In another embodiment, computer program 1210 accesses a birth certificate of second satellite device 1216B stored on electronic device 1220 or network access device 1202 and transmit such accessed birth certificate along with the appropriate credentials of computer program 1210 to network-accessible server system 1204.

Upon receipt of the satellite boot certificate or data indicating that the user is in possession of second satellite device 1216B and the credentials of computer program 1222, network-accessible server system 1204 verifies, using the received credentials, that computer program 1210 is a valid application in its system. Also, network-accessible server system 1204 verifies that the satellite boot certificate or data indicating that the user is in possession of second satellite device 1216B is legitimate. For instance, one or more verified satellite boot certificates may be listed on a satellite boot certificate registry on or associated with network-accessible server system 1204. Network-accessible server system 1204 compares the received satellite boot certificate to a satellite boot certificate stored in the satellite boot certificate registry. Upon a match, network-accessible server system 1204 knows that the received satellite boot certificate is valid. As an example, and for illustrative purposes, a satellite boot certificate can contain or be associated with a serial number of second satellite device 1216B. In another embodiment, network-accessible server system 1204 compares the received data indicating the user is in possession of second satellite device 1216B with previously stored data. Upon a match, network-accessible server system 1204 knows that the received data indicating the user is in possession of second satellite device 1216B is valid. Examples of credentials of computer program 1210 may include, but are not limited to, user name and password or any identifier agreed upon between computer program 1210 and network-accessible server system 1204. It should be appreciated that validating that the user of the computer program 1210 is valid and that the user is in possession of the satellite device may be performed in a particular sequence or in parallel.

Upon verifying that the user of computer program 1210 is valid and that the satellite boot certificate or possession of second satellite device 1216B is valid, network-accessible server system 1204 associates second satellite device 1216B with computer program 1210 and/or network access device 1202 for further communication.

In an embodiment, upon associating computer program 1210 and second satellite device 1216B, network-accessible server system 1204 pushes a digital certificate intended for second satellite device 1216B through or via network access device 1202. In another embodiment, upon associating computer program 1210 and second satellite device 1216B, network-accessible server system 1204 grants permission for second satellite device 1216B to have access to network access device 1202. For example, network-accessible server system 1204 may send a notification to network access device 1202 to accept any requests by second satellite device 1216B for access to the network. In another embodiment, upon receiving a request from second satellite device 1216B to access the network, network access device 1202 may transmit a verification request to network-accessible server system 1204 or to computer program 1210 intended for network-accessible server system 1204. Upon receiving such verification request, network-accessible server system 1204 can check whether second satellite device 1216B is an associated device. When second satellite device 1216B is an associated device, network-accessible server system 1204 can send a notification indicating that permission to access the network is granted. When second satellite device 1216B is not an associated device, network-accessible server system 1204 can send a notification indicating that permission to access the network is denied.

A specialized public key infrastructure (PKI) accessible to the network-accessible server system 1204 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 1204 will request a separate certificate for each mobile application and satellite device, For example, if the network access device is setup to be connected to a single mobile application and four satellite devices distributed throughout an environment (e.g., a home), then the network-accessible server system 204 may request five certificates and distribute a unique certificate to the mobile application and satellite devices.

Intermediate digital certificates may be distributed by one of the network-accessible server system 1204. Intermediate digital certificates may be generated for firmware verification. The intermediate digital certificates may include information indicative of identifying the network-accessible server system 1204. The network-accessible server system 1204 may digitally sign the firmware by providing information identifying the network-accessible server system 1204 on the intermediate digital certificate. The network access device may receive the intermediate digital certificate and determine that firmware has been digitally signed and is verified.

Upon receiving the digital certificate, second satellite device 1216B may have access to the Internet by using network access device 1202. In an embodiment, if network access device 1202 is not within communication range of second satellite device 1216B, second satellite device 1216B may communicate with network access device 1202 by using a satellite device, for example as in a daisy chain configuration or tree configuration. For example, in a user's household, the user's router (user's network access device) may be physically in the basement floor and the user's satellite device is in the upstairs kitchen. Thus, as the user walks up the stairs from the basement to one of the upstairs rooms, the user's cell phone access to the Internet may switch from being communicably connected directly to the user's router to being communicably connected directly to the user's satellite device, which is communicably connected directly to the user's router. To continue with the example, as the user walks downstairs, the user's cell phone access to the Internet may switch again from being communicably connected directly to the user's satellite device to being communicably connected directly to the user's router.

An automatic firmware update process and system is provided according to one or more embodiments. Providing for automatic updates of firmware can help to ensure an improved secure networking environment. For instance, relying on a customer to update his or her satellite device might result in the customer's satellite device lacking a security upgrade. In this and similar scenarios, the satellite device might be vulnerable to a malware attack because the satellite device lacks an antidote to the malware that was made available in a later version of the firmware.

In an embodiment and any of the satellite devices 1216A-N, network access device 1202, network-accessible server system 1204, and computer program 1210 may be configured to determine whether any satellite device (e.g., second satellite device 1216B) is configured with the most up-to-date or required firmware. It should be appreciated that while one satellite (e.g., second satellite device 1216B) may be used as an example in the following discussion, it is for illustrative purposes and is not meant to be limiting. In the example, the satellite boot certificate or other metadata associated with the satellite boot certificate can indicate an initial firmware version, which can be used by any of the above-cited entities to determine whether the firmware presently loaded on second satellite device 1216B matches the presently required firmware. For instance, a user could have purchased the satellite device months before installing the satellite device. It therefore could be possible that a newer version of the firmware became available during the time after the purchase and before installation. Thus, in this example, at installation, the firmware associated with the satellite boot certificate is not up-to-date.

In an embodiment, network-accessible server system 1204 pushes the required firmware intended for second satellite device 1216B by using network access device 1202. In an embodiment, the firmware that gets pushed onto any satellite device is digitally signed so that any configured entity can verify whether the firmware is valid and not malware imposing as legitimate firmware. In another embodiment, network access device 1202 may have the required firmware itself and may push such required firmware intended for second satellite device 1216B itself. In any way, embodiments herein ensure that a secure configuration is deployed to second satellite device 1216B, once second satellite device 1216B has been brought online.

An embodiment for monitoring firmware updates includes a satellite device being configured to identify its current firmware status and to send such status to the network access device or to the network-accessible server system. In an embodiment, the network access device determines whether the firmware status is up-to-date and, when not, either pushes a firmware update in its storage to the satellite device or transmits a request to the network-accessible server system for the most up-to-date firmware for the satellite device. In an embodiment, the network-accessible server system determines whether the firmware status is up-to-date and, when not, pushes a firmware update in its storage to the satellite device.

In an embodiment for monitoring firmware updates in a tree network architecture of two or more satellite devices, a first satellite can ping the other satellites in the tree network for the purposes of receiving their respective firmware versions. The first satellite is configured to compare its firmware version with received firmware versions. If the first satellite device concludes that their respective firmware versions match, then the first satellite device is configured to conclude that no firmware update is required. The first satellite device may send an update notification intended for the network-accessible server system. The first satellite device may be further configured to conclude that its firmware version is different from any of the other received firmware versions. The first satellite device, upon detecting that its firmware version does not match all other firmware versions, may be configured to report to the network-accessible server system that there is a discrepancy in firmware versions. In an embodiment, the network-accessible server system pushes the latest firmware version to the first satellite device. In another embodiment, the first satellite device, upon detecting that its firmware version does not match all other firmware versions, may be configured to report to the network access device that there is a discrepancy in firmware versions. In an embodiment, the network access device pushes the latest firmware version to the first satellite device. In an embodiment, upon receiving a notification from the first satellite device that there is a discrepancy of firmware versions on the network, the network access device may transmit a firmware update request to the network-accessible server system for firmware updates for the first satellite device and, optionally, for the other satellite devices on the network.

In an embodiment for monitoring firmware updates, each of the satellite devices on the network can upon request or periodically transmit their respective firmware statuses to the network access device. The network access device is configured to decide whether any firmware upgrades are required for any of the satellite devices on the network. In an embodiment, when an upgrade is required, the network access device can make a request for such upgrade to the network-accessible server system for the upgrade. In an embodiment, the network-accessible server system can automatically push a firmware upgrade for any satellite device to the network access device. Network access device can be configured to, upon receipt of the automatically pushed firmware upgrade from the network-accessible server system, automatically decide which satellite needs the upgrade and automatically push such upgrade to the satellite device.

It should be appreciated that network-accessible server system 1204 may push other configurations intended for second satellite device 1216B via network access device 1202. For example, such configurations enable second satellite device 1216B to be fully operative on network access device 1202. As another example, using electronic device 1220 and computer program 1222, a user can configure second satellite device 1216B by setting suitable parameters through a user interface on computer program 1210 that connects with network-accessible server system 1204. Then, network-accessible server system 1204 pushes the entered configurations intended for second satellite device 1216B via network access device 1202.

Upon obtaining Internet connectivity, second satellite device 1216B initiates self-registration in network-accessible server system 1204. Such an arrangement allows network access device 1202 and any number of satellites to be connected to network-accessible server system 1204, as well as the computer program 1222, regardless of whether electronic device 1220 resides within the network associated with network access device 1202. When electronic device 1220 resides outside of such network, changes requested through computer program 1210 can be carried out by network-accessible server system 1204. In some embodiments, each of a plurality of satellites within the network is connected to network access device 1202 in accordance with a hub-and-spoke approach (i.e., each satellite is connected directly to network access device 1202). In other embodiments, the satellites within the network are permitted to form a tree network architecture. Thus, each satellite need not necessarily be directly connected to the network access device. For example, as shown in FIG. 12, second satellite device 1216B can be connected to first satellite device 740, which is connected to network access device 1202.

By installing a separate digital certificate on each of network access device 1202, computer program 1222, and satellite device(s) (e.g., first satellite device 740 and second satellite device 1216B), network-accessible server system 1204 can ensure that these objects are tied together. Consequently, for an unauthorized entity to gain access to the network, the unauthorized entity would need to acquire the digital certificate in addition to the credentials (e.g., username and password) used to log into computer program 1222.

As described above, a specialized public key infrastructure (PKI) accessible to the network-accessible server system (e.g., network-accessible server system 1204) can be configured to facilitate the distribution of digital certificates, each of which may include a public encryption key, to the network access device(s) (e.g., network access device 1202), mobile application(s) (e.g., computer program 1222), and satellite(s) (e.g., a first satellite device and second satellite device) associated with a network. The network-accessible server system may communicate with the PKI via application programming interfaces (APIs), bulk data interfaces, etc. Generally, the network-accessible server system will request a separate certificate for each mobile application and satellite. For example, if the network access device is set up to be connected to a single mobile application and four satellites distributed throughout an environment (e.g., a home), then the network-accessible server system may request five certificates and distribute a unique certificate to each of the mobile application and satellites.

Intermediate digital certificates may be distributed by one of the network-accessible server system 1204 or the PKI module 434. Intermediate digital certificates may be generated for firmware verification. The intermediate digital certificates may include information indicative of identifying the network-accessible server system 1204. The network-accessible server system 1204 may digitally sign the firmware by providing information identifying the network-accessible server system 1204 on the intermediate digital certificate. The network access device 1202 may receive the intermediate digital certificate and determine that firmware has been digitally signed and is verified.

One benefit of the tree architecture described herein is that security risk can be lessened even when the network access device and the satellite(s) are produced by different entities. For example, an individual may have a router manufactured by Comcast® and an Orbi® Wi-Fi System manufactured by NETGEAR® deployed within her home. In such instances, the individual can log into a mobile application executing on her mobile phone, claim the network access device, and configure each satellite. In some embodiments, the network access device is configured to communicate with the satellite(s). For instance, in such embodiments, traffic received at either level (e.g., by the network access device or the satellite devices) can be examined for threats. In other embodiments, the satellite(s) operate independent from the network access device. In such embodiments, only traffic received by the satellite(s) may be examined for threats.

According to embodiments herein, each time a new electronic device (e.g., a new satellite device or a new mobile device) comes onto the network, the satellite device or the network access device to which the new electronic device connects can transmit a notification to the associated mobile application. The notification may prompt the user to specify whether network access should be permitted. While this type of multi-factor approval process requires an express indication of approval from a network administrator (e.g., the user responsible for deploying the network access device and/or satellite(s)), it can significantly lessen the security risk of unauthorized access. Administrator authorization may be required even if the party attempting to access the network has acquired the necessary credentials (e.g., the password).

In some embodiments and as described above, each network access device and/or satellite within a network environment is configured to automatically update its firmware. Thus, in accordance with embodiments herein, when these objects are properly connected (e.g., via a tree architecture), the firmware across all of the devices will be consistent. Such action ensures that a hacker cannot gain unauthorized access via a security flaw in an older firmware version that has not yet been manually updated by the network administrator.

Figure 8:
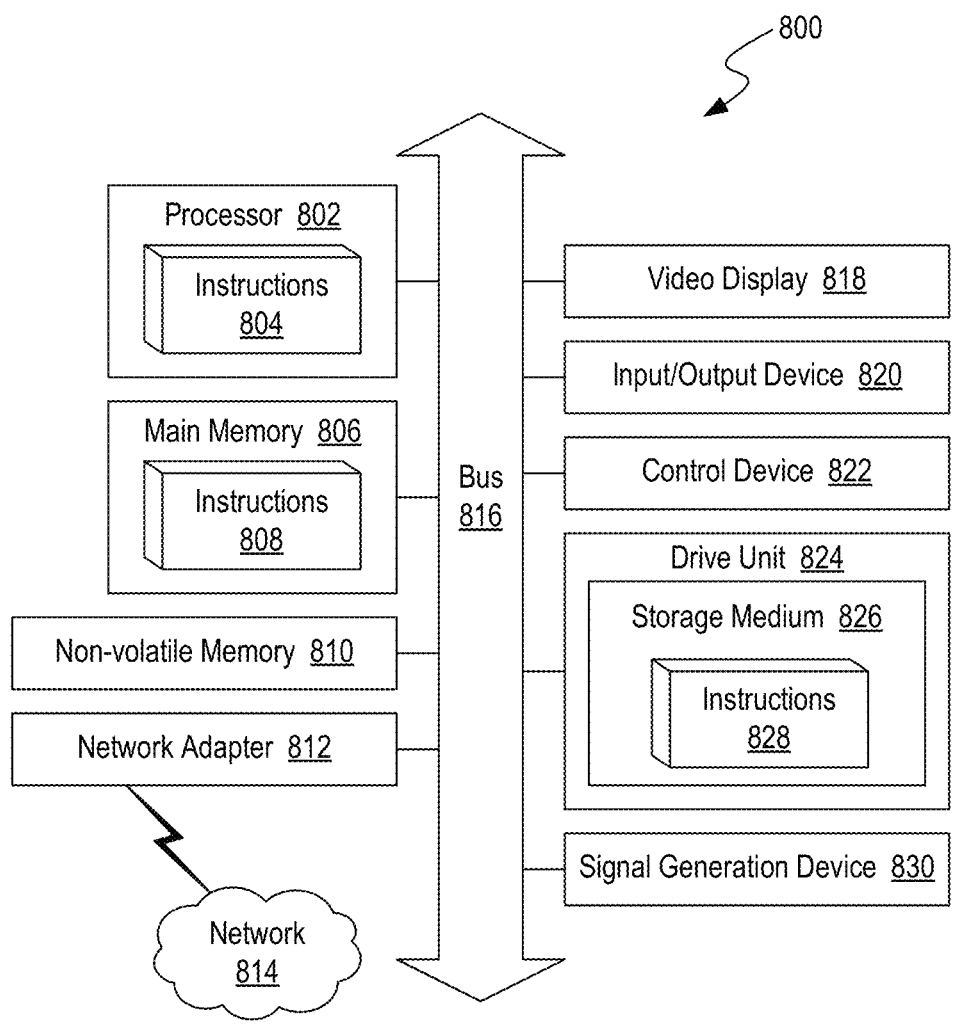
FIG. 8 is a block diagram illustrating an example computer system, in accordance with one or more embodiments.

FIG. 8 is a block diagram illustrating an example computer system 800, in accordance with one or more embodiments. Components of the example computer system 800 can be used to implement the systems illustrated and described in more detail with reference to FIGS. 1, 5. In some embodiments, components of the example computer system 800 are used to implement the ML system 500 illustrated and described in more detail with reference to FIG. 5. At least some operations described herein can be implemented on the computer system 800.

The computer system 800 can include one or more central processing units ("processors") 1002, main memory 1006, non-volatile memory 1010, network adapters 1012 (e.g., network interface), video displays 1018, input/output devices 620, control devices 622 (e.g., keyboard and pointing devices), drive units 624 including a storage medium 626, and a signal generation device 630 that are communicatively connected to a bus 1016. The bus 1016 is illustrated as an abstraction that represents one or more physical buses and/or point-to-point connections that are connected by appropriate bridges, adapters, or controllers. The bus 1016, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1000 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1000.

While the main memory 1006, non-volatile memory 1010, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the computer system 1000.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1004, 1008, 628) set at various times in various memory and storage devices in a computer device. When read and executed by the one or more processors 1002, the instruction(s) cause the computer system 1000 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1012 enables the computer system 1000 to mediate data in a network 1014 with an entity that is external to the computer system 1000 through any communication protocol supported by the computer system 1000 and the external entity. The network adapter 1012 can include a network adapter card, a wireless network interface card, a router, an AP, a wireless router, a switch, a multilayer switch, a protocol converter, a gateway, a bridge, a bridge router, a hub, a digital media receiver, and/or a repeater.

The network adapter 1012 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A computer-implemented method for client steering in a mesh network, the method, comprising:
    transmitting, by a first wireless access point of the mesh network, a quality of service (QOS) data packet to a client device of a plurality of client devices, the mesh network comprising a plurality of wireless access points comprising the first wireless access point;
    capturing a first received signal strength indication (RSSI) of the client device using the QoS data packet;
    determining a distance between the first wireless access point and the client device using a Wi-Fi round trip time (Wi-Fi RTT);
    determining a time and day of week;
    determining, using a machine learning model, a second wireless access point of the plurality of wireless access points for steering the client device to, based on the RSSI, the distance, and the time and day of week, wherein the machine learning model is trained to steer each client device of the plurality of client devices to a respective wireless access point of the plurality of wireless access points for increasing a throughput of the mesh network based on features extracted from client behavior of the plurality of client devices;
    connecting the second wireless access point to the client device;
    capturing a second RSSI of the client device;
    determining a difference between the first RSSI and the second RSSI;
    associating the time and day of week with the second RSSI and the distance to build a traffic pattern for the client device; and
    responsive to the difference exceeding a threshold difference, sending the difference to a cloud server for training the machine learning model.

2. The method of claim 1, wherein the client device is a first client device, and
    wherein training the machine learning model comprises:
        determining that a second client device is a stationary client device; and
        configuring the machine learning model to avoid steering the second client device.

3. The method of claim 1, comprising:
    extracting features from the client behavior of the plurality of client devices, wherein the features include RSSI metrics and distance metrics associated with times and days of week; and
    training the machine learning model, based on the features, to steer the each client device to the respective wireless access point for increasing the throughput.

4. The method of claim 3, comprising:
sending the RSSI metrics and distance metrics associated with times and days of week to the cloud server for extracting the features, wherein training the machine learning model is performed on the cloud server.

5. The method of claim 1, comprising:
determining that a location of the client device matches an expected location based on the extracted features; and
updating the machine learning model based on the location of the client device.

6. The method of claim 1, wherein the QoS data packet is a first QoS data packet and the distance is a first distance, the method comprising:
determining that a location of the client device mismatches an expected location based on the features; and
responsive to determining that the location mismatches the expected location:
transmitting a second QoS data packet to the client device for capturing the second RSSI of the client device using the second QoS data packet;
determining a second distance between the first wireless access point and the client device; and
training the machine learning model, based on the second RSSI and the second distance, to steer the client device for increasing the throughput.

7. The method of claim 1, wherein connecting the second wireless access point to the client device avoids null spots within the mesh network.

8. The method of claim 1, wherein transmitting the QoS data packet is performed responsive to booting of the first wireless access point.

9. The method of claim 1, comprising determining that the client device is connected to the first wireless access point for a first time based on determining absence of an identifier of the client device in a list of client devices maintained by the mesh network.

10. The method of claim 1, wherein the time and day of week is a first time and day of week, the method comprising:
determining a first location of the client device; and
determining, based on the machine learning model, that the client device will move to a second location at a second time and day of week.

11. A system for client steering in a mesh network, the system comprising:
one or more computer processors; and
a non-transitory computer-readable storage medium storing computer instructions, which when executed by the one or more computer processors cause the system to:
determine that a client device is connected to a wireless access point for a first time, the mesh network comprising a plurality of wireless access points comprising the wireless access point;
transmit a quality of service (QOS) data packet to the client device;
capture a first received signal strength indication (RSSI) of the client device using the QoS data packet;
determine a distance between the wireless access point and the client device;
determine a time and day of week;
capture a second RSSI of the client device;
determine a difference between the first RSSI and the second RSSI;
associate the time and day of week with the second RSSI and the distance to build a traffic pattern for the client device; and
responsive to the difference exceeding a threshold difference, send the difference, the distance, and the time and day of week to a cloud server for training a machine learning model to steer the client device to a respective wireless access point of the plurality of wireless access points for increasing a throughput of the mesh network based on the second RSSI, the distance, and the time and day of week.

12. The system of claim 11, wherein the computer instructions to determine that the client device is connected to the wireless access point are executed responsive to booting of the wireless access point.

13. The system of claim 11, wherein the computer instructions to determine that the client device is connected to the wireless access point for the first time cause the wireless access system to:
determine absence of an identifier of the client device in a list of client devices maintained by the mesh network.

14. The system of claim 11, wherein the time and day of week is a first time and day of week, and wherein the computer instructions cause the system to:
determine a first location of the client device; and
receive, from the cloud server, an indication that the client device will move to a second location at a second time and day of week based on the machine learning model.

15. The system of claim 11, wherein the computer instructions cause the system to:
receive, from the cloud server, the machine learning model; and
execute the machine learning model based on client behavior of the client device to steer the client device to the respective wireless access point for increasing the throughput.

16. The system of claim 11, wherein the client device is located at a first location, and wherein the computer instructions cause the system to:
prepare the plurality of wireless access points for steering the client device to the respective wireless access point, responsive to receiving an indication, from the cloud server, that the client device will move to a second location;
determine that the client device moved to a third location different from the second location; and
responsive to determining that the client device moved to the third location:
send the second RSSI to the cloud server for training the machine learning model.

17. The system of claim 11, wherein the client device is a first client device, and wherein the computer instructions cause the system to:
determine that a second client device is a stationary client device; and
configure the machine learning model to avoid steering the second client device.

18. The system of claim 11, wherein the computer instructions cause the system to:
extract features from client behavior of the client device, wherein the features include RSSI metrics and distance metrics associated with times and days of week; and
train the machine learning model, based on the features, to steer the client device to the respective wireless access point for increasing the throughput.

19. The system of claim 11, wherein the computer instructions cause the system to:

determine that a location of the client device matches an expected location based on the machine learning model; and update the machine learning model based on the location of the client device.

* * * * *